(12) United States Patent
Ledet et al.

(10) Patent No.: US 7,213,629 B2
(45) Date of Patent: May 8, 2007

(54) VACUUM ASSISTED PLY PLACEMENT SHOE AND METHOD

(75) Inventors: Roger J. Ledet, Winnipeg (CA); Arnold J. Lauder, Winnipeg (CA); Mathew J. Shewfelt, Winnipeg (CA)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/437,067

(22) Filed: May 14, 2003

(65) Prior Publication Data

US 2004/0226651 A1    Nov. 18, 2004

(51) Int. Cl.
*B32B 37/10* (2006.01)
*B32B 37/22* (2006.01)
*B32B 41/00* (2006.01)

(52) U.S. Cl. .................. 156/378; 156/379; 156/382; 156/381; 156/580

(58) Field of Classification Search ............... 156/378, 156/379, 580, 351, 381, 382, 285
See application file for complete search history.

(56) References Cited

U.S. PATENT DOCUMENTS

| | | | | |
|---|---|---|---|---|
| 4,432,828 A | * | 2/1984 | Siempelkamp et al. | 156/285 |
| 4,990,213 A | * | 2/1991 | Brown et al. | 156/425 |
| 5,148,572 A | | 9/1992 | Wells et al. | 15/118 |
| 5,562,788 A | * | 10/1996 | Kitson et al. | 156/64 |
| 5,954,917 A | | 9/1999 | Jackson et al. | 156/433 |
| 6,041,840 A | | 3/2000 | Ogawa | 156/382 |
| 6,312,247 B1 | | 11/2001 | Kassuelke et al. | 425/504 |
| 6,391,436 B1 | | 5/2002 | Xu et al. | 428/298.1 |
| 6,474,389 B1 | * | 11/2002 | Steelman et al. | 156/382 |
| 2003/0015298 A1 | | 1/2003 | Steelman et al. | 156/555 |

* cited by examiner

*Primary Examiner*—George Koch
(74) *Attorney, Agent, or Firm*—Baker & Hostetler LLP

(57) ABSTRACT

A device for placing a ply on a substrate surface includes a vacuum manifold assembly configured for attachment to a vacuum source and a substrate seal configured to provide a substantially gas impermeable interface with the substrate surface. This device further includes a ply seal configured to provide a substantially gas impermeable interface with the ply. In this manner, vacuum applied to the vacuum manifold assembly depressurizes an area between the ply and the substrate surface.

21 Claims, 5 Drawing Sheets

VACUUM ASSISTED PLY PLACEMENT SHOE AND METHOD

FIELD OF THE INVENTION

The present invention generally relates to a ply placement device. More particularly, the present invention pertains to a vacuum assisted ply placement device.

BACKGROUND OF THE INVENTION

Laminated materials such as, for example, composites are widely utilized to increase structural rigidity in a wide variety of products. For example, composites are generally utilized by the airplane construction industry to build structural members of airframes. In some of the most advanced aircraft, where high strength and rigidity and low weight are extremely important, composites may account for a significant portion of the airframe as well as the external surface or skin. Typically, these composites are constructed from a plurality of layers placed over a form. These layers are often referred to as partial or full plies. For structures exceeding the available material width, each layer is typically made up of a series of strips or courses of material placed edge to edge next to each other. Each ply may be in the form of woven fibers in a fabric, unidirectional fiber material or a variety of other conformations. Unidirectional fiber material is often termed, "tape." The fibers may be made from any of a multitude of natural and/or "man-made" materials such as fiberglass, graphite, Kevlar®, and the like.

While these plies may simply include the above described fibers, generally the plies are pre-impregnated with a resin. Resins are typically formulated to allow the ply to adhere to the form as well as to previously applied plies. If some plies do not adequately adhere to their respective substrate, such as the previously applied plies or the form, internal and/or external surface imperfections. Accordingly, in order to facilitate proper adhesion, pressure is typically applied to the plies during and/or after ply placement.

For relatively small items, a press may be employed. For example, some known presses utilize a vacuum debulking table. In such arrangements, following placement of the plies, the part, referred to as a layup, is placed on the debulking table, a membrane is placed over the layup, and a pump is employed to remove the air from the layup. As the layup is depressurized, a compressive force is applied by the atmospheric pressure and air within the layup is removed. However, as the size of the layup increases and/or permeability of the layup decreases, the use of debulking tables tends to become undesirably expensive and cumbersome.

For relatively larger items, a rolling press may be employed. For example, in some known rolling presses, tape is dispensed from a dispensing head and then pressed on the substrate surface with a compaction roller. While the exact amount of force exerted by the roller depends upon a variety of factors, 100 Kg or more is often utilized in certain applications. In order to exert this relatively large force while accurately placing plies, substantial support and guidance structures are generally required. Another disadvantage of such known rolling presses is that a correspondingly substantial support is required for the form in order to withstand the force exerted by the roller. These and other disadvantages associated with the relatively large forces employed by rolling press systems greatly increase the costs of producing composite items.

Accordingly, it is desirable to provide a method and apparatus capable of overcoming the disadvantages described herein at least to some extent.

SUMMARY OF THE INVENTION

The foregoing needs are met, to a great extent, by the present invention, wherein in one respect an apparatus and method is provided that in some embodiments accurately place plies and generate sufficient force to facilitate proper adhesion of the plies to the substrate.

In accordance with an embodiment of the present invention, a device for placing a ply on a substrate surface includes a vacuum manifold assembly configured for attachment to a vacuum source and a substrate seal configured to provide a substantially gas impermeable interface with the substrate surface. This device further includes a ply seal configured to provide a substantially gas impermeable interface with the ply. In this manner, vacuum applied to the vacuum manifold assembly depressurizes an area between the ply and the substrate surface.

In accordance with another embodiment of the present invention, a system for placing a ply or a substrate surface includes a vacuum assisted ply placement device configured to apply a ply on a substrate surface. This ply placement device includes a vacuum manifold assembly configured for attachment to a vacuum source and a substrate seal configured to provide a substantially gas impermeable interface with the substrate surface. This ply placement device further includes a ply seal configured to provide a substantially gas impermeable interface with the ply. In this manner, vacuum applied to the vacuum manifold assembly depressurizes an area between the ply and the substrate surface. The system for placing the ply further includes a control system that controls movement of the ply placement device relative to the substrate. Thus, the ply is dispensed from the ply placement device in response to the movement of the ply placement device relative to the substrate.

In accordance with yet another embodiment of the present invention, a method of producing a composite structure includes steps of preparing a layup form having a substrate surface configured to receive a ply and introducing a vacuum assisted ply placement device to the substrate surface. The method further includes applying the ply to the substrate surface to In accordance with yet again another embodiment of the present invention, an apparatus for producing a composite structure includes a means for preparing a layup form means having a substrate surface configured to receive a ply means and a means for introducing a vacuum assisted ply placement device to the substrate surface. The apparatus further includes a means for applying the ply means to the substrate surface to produce the composite structure and a means for curing the composite structure.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions

DETAILED DESCRIPTION OF THE PREFERRED EMBODIMENT

The present invention provides a ply placement device and method. In some embodiments, the ply placement device includes a vacuum manifold assembly configured for attachment to a vacuum source and a substrate seal configured to provide a substantially gas impermeable sliding interface with a substrate surface, such as the surface of a layup form, the surface of previously placed plies, and any other surface on to which the ply may be placed. The ply placement device also includes a ply seal configured to provide a substantially gas impermeable sliding interface with the ply. Vacuum applied to the vacuum manifold assembly depressurizes an area between the ply and the substrate surface.

Another embodiment in accordance with the present invention provides a method of producing a composite structure. A layup form corresponding to the composite structure and having a substrate surface configured to receive a ply is prepared. A vacuum assisted ply surface to produce the composite structure. The composite structure is cured to bind the multiple plies of the composite product together to generate a strong, cohesive structure.

Advantages of various embodiments of the invention include: (1) reduce the load to be exerted by the support and guidance structures; (2) reduce the load on the layup form by the ply placement system; (3) increased duration of force pressing the ply on the substrate; (4) decreasing occurrences of air pockets between placed plies and substrate (layup form and/or substrate plies); and (5) ability to utilize relatively wider ply material.

Figure 1:
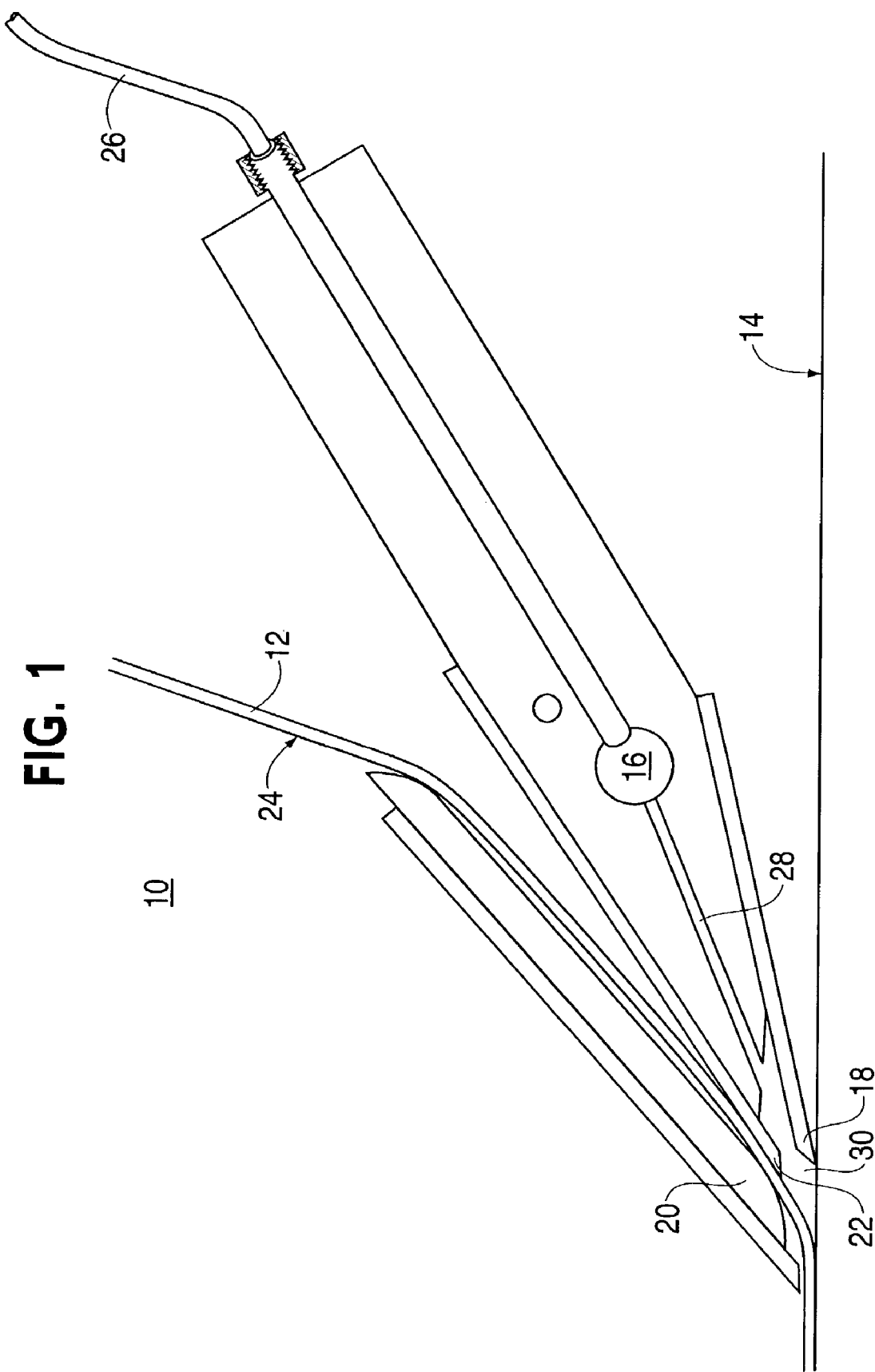
FIG. 1 is a cutaway view of a ply placement device according to an embodiment of the invention.

The invention will now be described with reference to the drawing figures, in which like reference numerals refer to like parts throughout. As shown in FIG. 1, a vacuum assisted ply placement device 10 ("VAPPS") is configured to place and apply a ply 12 on a substrate 14. The VAPPS 10 includes a vacuum manifold 16, a lower seal 18, an upper bridge 20, and an upper seal 22. The lower seal 18 is configured to bear against the substrate 14 and form a substantially gas impermeable interface between the lower seal 18 and the substrate 14. In addition, as a result of the action of the lower seal 18 pressing upon the substrate 14, the upper seal 22 is caused to bear against the ply 12 and press the ply 12 against the upper bridge 20. In this manner, a substantially gas impermeable interface between the upper seal 22 and the ply 12 may be formed. Furthermore, in various embodiments of the invention, the ply 12 or, more preferably, a backing 24 on the ply 12 is configured to be substantially gas impermeable.

The vacuum manifold 16 may be attached to a vacuum source by, for example, a vacuum hose 26 in any suitable manner. The vacuum manifold 16 includes one or more channels 28 configured to connect the vacuum manifold 16 to an area at, or near, a trailing tip 30 of the VAPPS 10.

Figure 2:
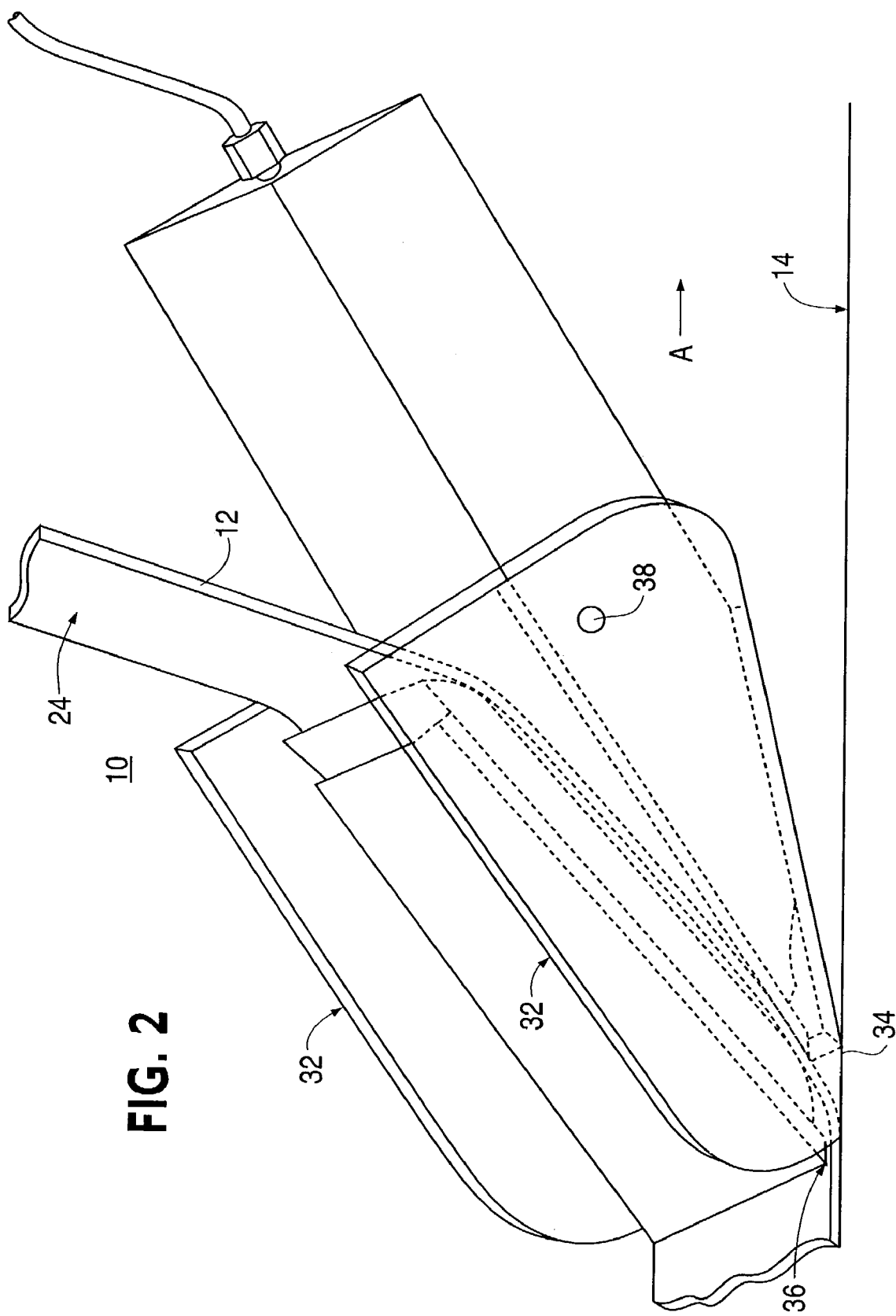
FIG. 2 is a perspective view of the ply placement device of FIG. 1.

As illustrated in FIG. 2, a side plate 32 is attached to each side of the VAPPS 10. These side plates 32 are configured to essentially seal the side edges of the lower seal 18 and the upper seal 22. In addition, the side plates 32 are configured to bear against the respective edges and the respective side plates 32. Furthermore, the side plates 32 include a bottom edge 34 configured bear against the substrate 14 to form a substantially gas impermeable interface between the substrate 14 and the respective bottom edges 34. Together, the bottom edges 34 and the lower seal 18 form a substrate seal configured to provide a substantially gas impermeable interface with the surface of the substrate 14. This substrate seal is maintained as the VAPPS 10 is moved and slides relative to the substrate 14 as described herein. Moreover, the side plates 32 in combination with the upper seal 22 form a ply seal configured to provide a substantially gas impermeable interface with the ply 12 and/or the backing 24. This ply seal is maintained as the ply 12 is drawn out of the VAPPS 10 as described herein below.

In operation, the VAPPS 10 is moved the in the direction shown by arrow A relative to the substrate 14. As gas, for example air, is removed from the trailing tip 30, a depressurized area is formed between the substrate 14 and the backing 24 and/or the ply 12. As the VAPPS 10 continues to move in direction A relative to the substrate 14, the ply 12 is drawn towards the substrate 14. Prior to the relative movement of the VAPPS 10 to the substrate 14, an end of the ply 12 extending from the VAPPS 10 is attached to the substrate 14 by the action of a sweep 36 pressing the ply 12 against the substrate 14. This process is often referred to as "tacking." Thereafter, as the VAPPS 10 is moved relative to the substrate 14, the ply 12 is caused to be drawn out of the VAPPS 10.

Figure 3:
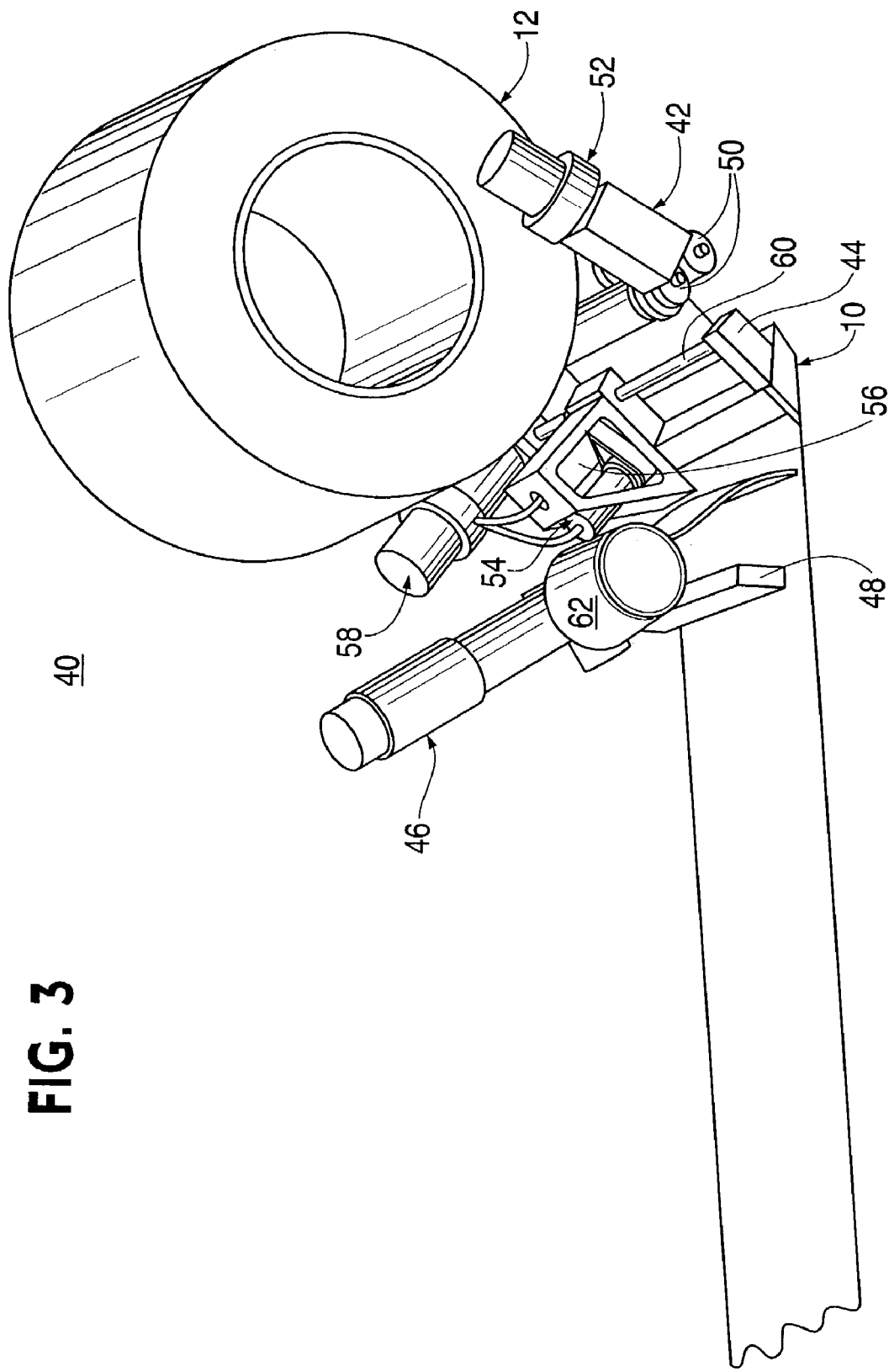
FIG. 3 illustrates an exemplary dispensing head according to an embodiment of the invention.

Depending on the strength of the vacuum source and/or the level of regulated vacuum applied, a result of the depressurization between the substrate 14 and the ply 12 and/or the backing 24, the ply 12 is pressed unto the substrate 14 with a force [" $f_{at}$ "] approaching ambient atmospheric pressure. Depending upon the permeability of the backing 24, the ply 12, and the substrate 14, the $f_{at}$ may continue to consolidate the ply 12 and/or the substrate 14 for approximately several seconds. The elapsed time interval of pressure provides the ability of the ply 12 to form a relatively stronger bond with the substrate 14, than conventional ply placement The VAPPS 10 further includes a connector 38 configured to attach the VAPPS 10 to a dispensing head, as seen in FIG. 3. In various embodiments of the invention, the connector 38 may be configured to provide pivotal, retractable, and/or essentially rigid attachment to the dispensing head. Preferably pivotal movement of the VAPPS 10 relative to the dispensing head may occur in more than one axis at a time and may be controlled by any suitable means.

As shown in FIG. 3, a dispensing head 40 suitable for use in an embodiment of the invention includes a material feeder 42, a cutting assembly 44, a heater assembly 46, and sensor 48. The material feeder 42 is configured to control the movement of the ply 12 into the VAPPS 10 during various stages of ply placement. For example, the material feeder 42 may include a plurality of rollers 50 configured to engage the ply 12 and controlled to rotate via the action of a motor 52. In addition, the material feeder 42 is configured to disengage the rollers 50 to allow the ply 12 to move freely.

The cutting assembly 44 is configured to cut the ply 12 and/or the backing 24 in a controlled manner. The cutting assembly 44 may employ any known cutting device such as various bladed devices, lasers, and the like. In a specific example, the cutting assembly 44 includes an ultrasonic knife 54 controlled to rotate by the action of a motor 56. The ultrasonic knife 54 is further controlled to traverse the full width of the ply 12 or any portion thereof by the action of a motor 58 configured to rotate a jackscrew 60.

When utilizing specific materials and/or operating conditions in which heating of the material is advantageous, the heater assembly 46 is configured to impart thermal energy upon the ply 12. In this regard, any known device operable to heat the ply 12 in a suitable manner may be utilized by various embodiments of the invention. For example, the heater assembly 46 may include a diverter valve 62 configured to control the flow of heated air directed onto the ply 12.

The sensor 48 is configured to sense the ply 12. For example, the sensor 48 may the sensor 48 may be configured to sense the ply 12 being placed by the dispensing head 40. In addition, the sensor 48 may sense a previously placed ply 12. In this manner, the position of the ply 12 being placed relative to the previously placed ply 12 may be determined. The sensor 48 and/or other sensors may also be utilized for flaw detection, material tension, material utilization, and the like. Furthermore, the sensor 48 and/or other sensors may be operable to sense attributes of underlying substrate 14 such as density, thickness, and the like.

Figure 4:
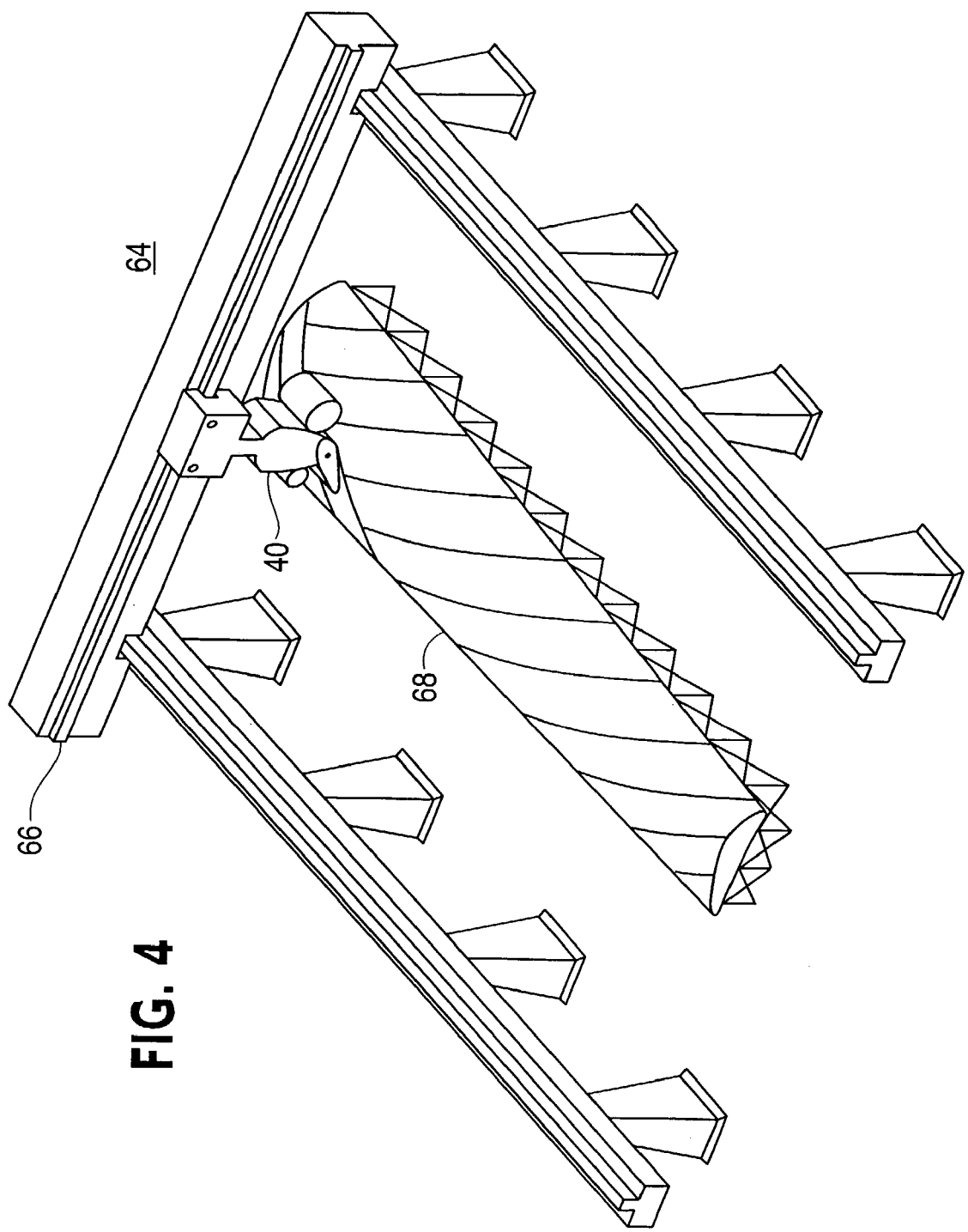
FIG. 4 illustrates an exemplary ply placement system according to an embodiment of the invention.

As shown in FIG. 4, a gantry-type, automated tape laying device ["ATLD"] 64 suitable for use in an embodiment of the invention includes a gantry 66, the dispensing head 40, and a form 68. The gantry 66 is configured to control the movement of the dispensing head 40. In an embodiment of the invention, the gantry 66 is configured to control ten axis of movement (five axis of the gantry and five axis of the dispensing head 40). However, it is to be understood that the specific number of axis may depend upon the particular operating condition and thus, the number of axis controlled is not critical to the invention. A benefit of various embodiments of the invention is that the gantry 66 need not be configured to impart the force of a compaction roller upon the layup and form. Thus, the gantry 66 may be relatively lighter and less rigid than conventional automated tape laying devices. The form 68 is configured to provide a suitably stable surface for ply placement. It is another benefit of various embodiments of the invention is that the form 68 need not be configured to withstand the force of a compaction roller.

Figure 5:
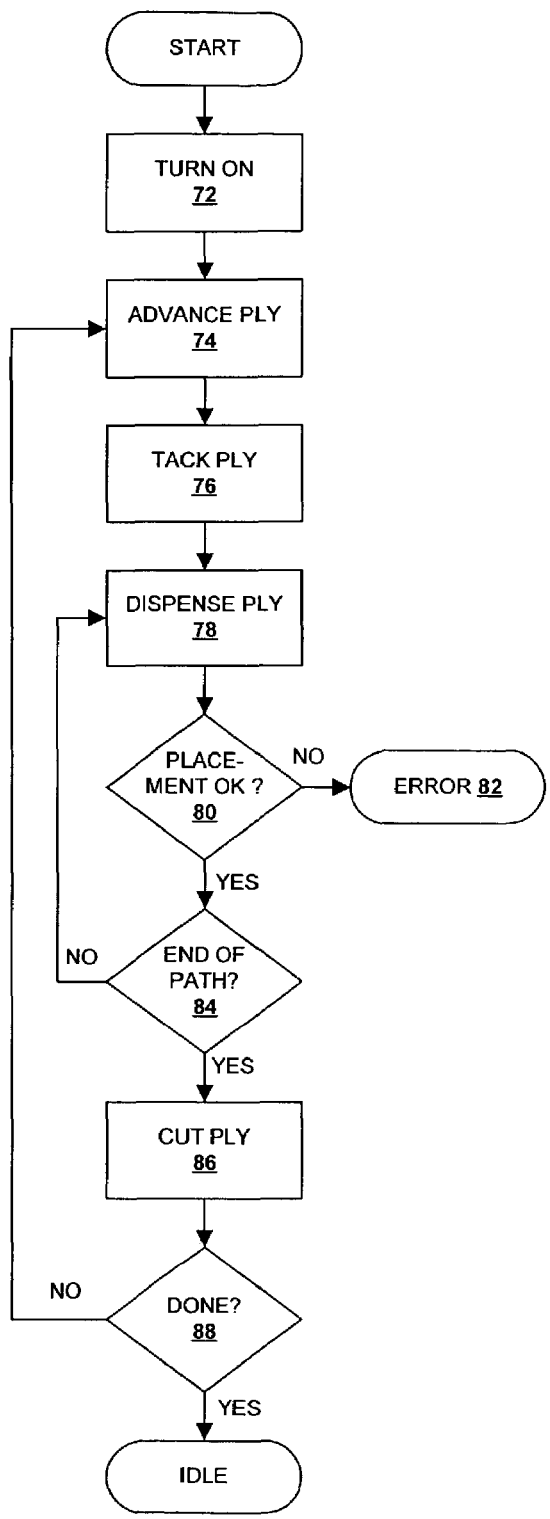
FIG. 5 is a flowchart illustrating steps that maybe followed in accordance with an embodiment of the method or process.

FIG. 5 illustrates steps involved in a method 70 of placing plies to produce a composite structure or product. Prior to the initiation of the method 70, a composite product is designed and a series of computer readable instructions specifying attributes of the composite product is generated. These instructions are utilized to control the operations of the ATLD 64 and construct a form such as the form 68. This form is further positioned within the operational area of the ATLD 64.

At step 72, the method 70 is initiated by turning on the various components of the At step 74, the ply 12 is advanced by the action of the material feeder 42. For example, the rollers 50 may engage the ply 12 and advance the ply through the VAPPS 10 until the ply 12 is positioned to be applied to the substrate 14, referred to as being tacked. To ensure the ply 12 has advanced a suitable amount, the sensor 48 may be utilized to sense the position of the ply 12. In addition, the location on the form 68 is determined based upon the series of computer readable instruction and/or the location of a previously positioned ply 12. Furthermore, prior to tacking the ply 12 to the substrate at step 76, the end of the ply 12 may be cut based upon the series of computer readable instruction, the orientation of a previously positioned ply 12, and/or the location of a previously positioned ply 12. Following step 74, the rollers 50 may disengage the ply 12 to allow for unimpeded dispensing of the ply 12.

At step 76, the ply 12 is tacked to the substrate. In an embodiment of the invention, the ply 12 is tacked by positioning the VAPPS 10 with the ATLD 64 such that the sweep 36 is controlled to press the ply 12 on to the substrate with sufficient force so as to cause the ply 12 to adhere to the substrate. In addition, the lower seal 18 and the bottom edges 34 are controlled to contact the substrate 14. In this manner, as air is withdrawn via the vacuum manifold 16 and a depressurized area is formed at the trailing tip 30.

At step 78, the ply 12 is dispensed along a path across the form 68. In order to minimize deformations in the ply 12 (e.g., wrinkles), this path is typically calculated to coincide with a "natural path" based upon any contours in the form 68. As the dispensing head 40 is controlled along the path across the form 68, any leakage of air into the depressurized area is removed from the trailing tip 30 by the action of the vacuum source. In this manner, the depressurized area is maintained between the substrate 14 and the backing 24 and/or the ply 12. This depressurized area is defined by the boundaries created by the seals 18 and 22, the bottom edges 34 of the side plates 32, the substrate 14, and the backing 24 and/or the ply 12. As the dispensing head 40 moves along the path, the ply 12 is drawn out of the dispensing head 40 and moves along the path, a section of the ply 12 is drawn out of the dispensing head to a point in which support provided by the upper seal 22 is no longer sufficient to withstand the fat and maintain a separation of the ply 12 from the substrate 14. Thus, this section of the ply 12 is pressed on to the substrate 14.

An advantage various embodiments of the invention as compared to known ply placement devices is a relatively extended duration pressure is applied to the ply 12. This extended duration increases the likelihood the ply 12 will adequately adhere to the substrate 14. A further benefit is that due to the removal of air between the ply 12 and the substrate 14, the occurrence of air pockets or voids is reduced as compared to known ply placement devices.

At step 80, the placement of the ply 12 on the substrate 14 is evaluated. For example, the sensor 48 may sense the relative position of the ply 12 and a previously positioned ply 12 and determine if the distance between these plies is within a predetermined tolerance. If the distance between these plies is not within the predetermined tolerance, an error may be generated at step 82. If the distance between these plies is within the predetermined tolerance, it is determined if the end of the path has been reached at step 84.

At step 84, it is determined if the end of the path has been reached. If, based on the series of computer readable instruction, it is determined the dispensing head 40 has not advanced to the end of the path, additional ply 12 is dispensed at step 78. If, it is determined the dispensing head 40 has advanced to the end of the path, the ply 12 is cut at step 86.

At step 86, the end of the ply 12 may be cut based upon the series of computer readable instruction, the orientation of a previously positioned ply 12, and/or the location of a previously positioned ply 12. Optionally, if the ply 12 includes a backing 24, this backing 24 may be removed prior to placing another ply 12. This backing 24 may be removed by an automated take-up device positioned on the dispensing head 40 by an operator, or any other At step 88, it is determined if the placement of plies 12 on the composite product has been completed. For example, if all of the computer readable instructions have been completed, it may be determined that the placement of plies for the composite product has been completed and the ATLD 64 may idle until another series of computer readable instructions is initiated. If is determined the placement of plies 12 for the composite product is not completed, an additional ply 12 placement may proceed at step 74.

Following the method 70, the composite product may be cured in any suitable manner. In the aerospace industry, thermoset resins are generally utilized to pre-impregnate ply material. These thermoset resins are typically cured by being held at an elevated temperature for a predetermined amount of time. Times and temperatures may be selected depending on the resin used, the size and thickness of the composite product, and the like. An advantage of at least some embodiments of the invention is that the utilization of vacuum assisted ply placement allows for the use of relatively wider ply 12. In known ply placement systems, wider ply stock necessitates the use of longer compaction rollers and thus greater force on the compaction rollers to achieve adequate kilograms per centimeters$^2$ ("Kg/cm$^2$") load across the ply.

Although an example of the VAPPS 10 is shown being controlled by the gantry 66, it will be appreciated that other control systems can be used. In this regard, it is an advantage of embodiments of the invention over known ply placement devices that support and control structures can be made lighter due to the elimination of the compaction roller. Also, although the VAPPS 10 is useful to place plies for composite products in the airline industry it can also be used in other industries that construct composite product. These industries include, but are not limited to, automobile, marine, spacecraft, building, and consumer products.

The many features and advantages of the invention are apparent from the detailed specification, and thus, it is intended by the appended claims to cover all such features and advantages of the invention which fall within the true spirit and scope of the invention. Further, desired to limit the invention to the exact construction and operation illustrated and described, and accordingly, all suitable modifications and equivalents may be resorted to, falling within the

What is claimed is:

1. A device for placing a ply on a substrate surface, comprising:
    a vacuum manifold assembly configured for attachment to a vacuum source;
    an edged substrate seal comprising an essentially planar body and an edge, the edge being disposed transversely relative to a direction of movement of the device and configured to provide a substantially gas impermeable interface with the substrate surface; and
    a ply seal configured to provide a substantially gas impermeable interface with the ply, wherein vacuum applied to the vacuum manifold assembly depressurizes an area between the ply and the substrate surface; and
    a bridge disposed in alignment with the ply seal to sandwich the ply between the bridge and the ply seal and urge the ply to bear upon the ply seal.

2. The ply placement device of claim 1, further comprising a cutter configured to cut the ply.

3. The ply placement device of claim 1, further comprising a heater configured to apply heat to the ply.

4. The ply placement device of claim 1, further comprising at least one sensor configured to sense a condition of the ply.

5. The ply placement device of claim 4, wherein the at least one sensor includes an optical sensor.

6. The ply placement device of claim 4, wherein the at least one sensor includes a sensor configured to locate an edge of a previously applied ply.

7. The ply placement device of claim 1, wherein the substrate seal is configured to substantially conform to a surface of the substrate.

8. A system for placing a ply or a substrate surface comprising:
    a vacuum assisted ply placement device configured to apply a ply on a substrate surface, comprising:
        a vacuum manifold assembly configured for attachment to a vacuum source;
        an edged substrate seal comprising an essentially planar body and an edge, the edge being disposed transversely relative to a direction of movement of the device and configured to provide a substantially gas impermeable interface with the substrate surface; and
        a ply seal configured to provide a substantially gas impermeable interface with the ply, wherein vacuum applied to the vacuum manifold assembly depressurizes an area between the ply and the substrate surface; and
        a bridge disposed in alignment with the ply seal to sandwich the ply between the bridge and the ply seal and urge the ply to bear upon the ply seal and
    a control system that controls movement of the ply placement device relative to the substrate, wherein the ply is dispensed from the ply placement device in response to the movement of the ply placement device relative to the substrate.

9. The ply placement system of claim 8, further comprising a reel for supporting a supply of the ply.

10. The ply placement system of claim 8, wherein the substrate seal is configured to conform to a curvature of a surface of the substrate.

11. The ply placement system of claim 8, wherein the ply placement device is pivotally attached to the control system, whereby the ply placement device is configured to follow a contour of the substrate.

12. The ply placement system of claim 8, further comprising a cutter for cutting the ply.

13. The ply placement system of claim 8, further comprising a heater for applying heat to the ply.

14. The ply placement system of claim 8, further comprising at least one sensor for sensing a condition of the ply.

15. The ply placement system of claim 14, wherein the at least one sensor includes an optical sensor.

16. The ply placement system of claim 14, wherein the at least one sensor includes means for locating an edge of a previously applied ply.

17. An apparatus for producing a composite structure, comprising:
means for preparing a layup form means having a substrate surface configured to receive a ply means;
means for introducing a vacuum assisted ply placement device to the substrate surface, wherein the vacuum assisted ply placement device comprises:
an edged substrate sealing means comprising an essentially planar body and an edge, the edge being disposed transversely relative to a direction of movement of the apparatus and configured to provide a substantially gas impermeable interface with the substrate surface;
an edged ply sealing means to provide a substantially gas impermeable interface between the ply means and the ply placement device, the edged ply sealing means being configured to transversely span the ply means relative to a direction of movement of the ply means; and
a bridging means disposed in alignment with the edged ply sealing means to sandwich the ply means between the bridging means and the edged ply sealing means and urge the ply means to bear upon the edged ply sealing means; and
means for applying the ply means to the substrate surface to produce the composite structure; and
means for curing the composite structure.

18. The apparatus of claim 17, further comprising a means for tacking a first end of the ply means to the substrate surface.

19. The apparatus of claim 17, further comprising a means for sensing a condition of the applied ply means.

20. The apparatus of claim 19, further comprising a means for determining whether the applied ply means is placed within a predetermined location based on the sensing means.

21. The apparatus of claim 17, further comprising a means for cutting the ply means.

* * * * *